J. B. PERRY.
SAW JOINTER AND GAGE.
APPLICATION FILED NOV. 19, 1914.
1,163,555.
Patented Dec. 7, 1915.
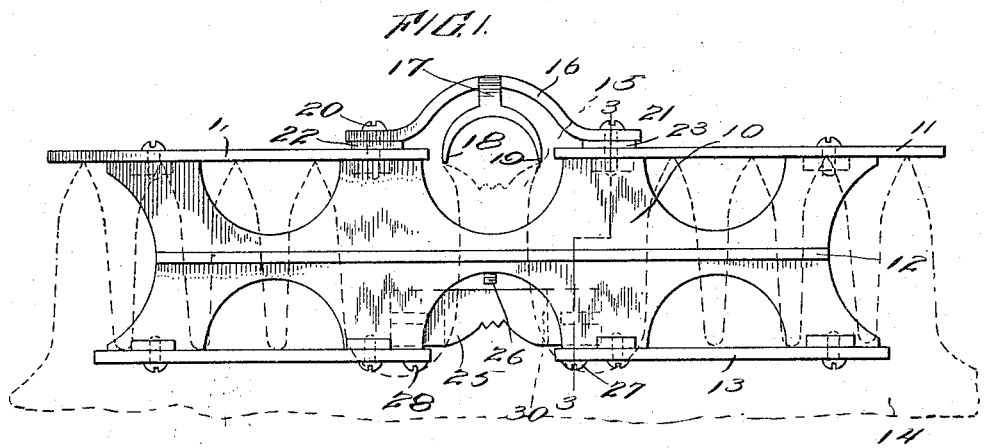
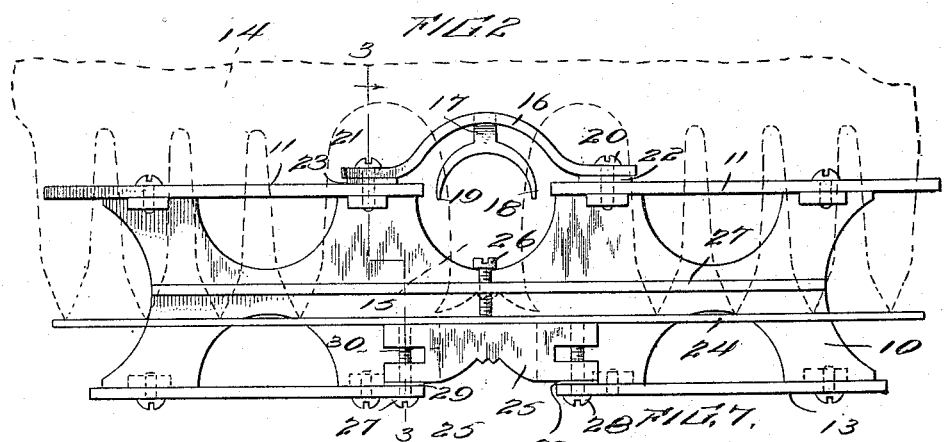
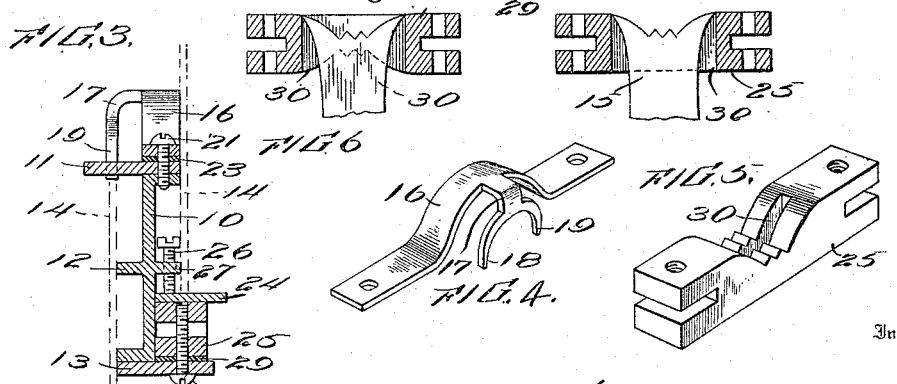
Inventor
John B. Perry,
By Mason Fenwick & Lawrence,
Attorneys
Witnesses

UNITED STATES PATENT OFFICE.

JOHN B. PERRY, OF EDMONDS, WASHINGTON.

SAW JOINTER AND GAGE.

1,163,555.  Specification of Letters Patent.  Patented Dec. 7, 1915.

Application filed November 19, 1914. Serial No. 873,037.

*To all whom it may concern:*

Be it known that I, JOHN B. PERRY, a citizen of the United States, residing at Edmonds, in the county of Snohomish and State of Washington, have invented certain new and useful Improvements in Saw Jointers and Gages; and I do hereby declare the following to be a full, clear, and exact description of the invention, such as will enable others skilled in the art to which it appertains to make and use the same.

This invention relates to saw jointers and gages and has for an object to provide a device for use in conjunction with the usual saw known as a cross-cut saw, or a saw employing rakers as distinguished from teeth, which said rakers are necessarily shorter than the teeth and embodying improved means for gaging the dressing of such raker as well as providing a guide for such dressing.

A further object of the invention is to provide a device which will gage and form a pattern for the dressing of the rakers with one prong of the raker longer than the other prong.

It is well known that to do its best work the rakers of a saw must be a certain predetermined fraction of an inch shorter than the cutting teeth. It is also well known that at least for some uses to which a cross-cut saw is employed it is desirable to have one of the prongs of the raker longer than the other prong, the longer prong being nearest to the ends of the saw beginning at the center and working both ways.

An object of the present invention is, therefore, to provide means for dressing the raker of a saw so that one of the prongs may be longer than the other, with means for adjusting not only the difference in length of the prongs of the raker but also to vary their relations to the cutting teeth and to determine whether or not such raker prongs are of the desired or required height, either of similar or different height.

With these and other objects the invention comprises certain novel constructions, combinations and arrangement of parts as will be hereinafter more fully described and claimed;

In the drawings: Figure 1 is a view of the improved gage in said elevation, with a convention cross-cut saw shown in dotted lines with the gage in engagement with the prongs of a raker. Fig. 2 is a view of the device carrying a file and used as an ordinary jointer. Fig. 3 is a transverse sectional view taken on line 3—3 of Figs. 1 and 2.
Fig. 4 is a perspective view of the gage member removed from the body. Fig. 5 is a perspective view of the filing block. Fig. 6 is a longitudinal sectional view of the filing block shown in position to dress down the raker teeth to a certain predetermined height relative to the cutting teeth. Fig. 7 is a longitudinal sectional view through the filing block showing the block employed as a pattern for filing or dressing the raker.

Like characters of reference designate corresponding parts throughout the several views.

The improved jointer and gage which forms the subject-matter of this application comprises a body 10 having a flange 11 secured thereto and preferably interrupted at the middle as shown more particularly in Figs. 1 and 2 with ribs 12 and 13 positioned to engage against the side of the saw shown in dotted lines at 14, such engagement being particularly shown in Fig. 3. With the saw in the position shown in Figs. 1 and 3 it is obvious that the flange 11 will bear upon the extreme points of the teeth and if positioned as shown in Fig. 1 the raker 15 will be positioned between the inner extremities of the sections, that is to say at the middle of the flange 11.

Spanning the interval where the flange 11 is interrupted is an arched member 16 having an offset arm 17 carrying points 18 and 19 positioned in the plane of the saw 14 as shown more particularly in Fig. 3. The arched member 16 is attached to the body 10 in any approved manner for adjustment, here shown as by employing screws 20 and 21 with elastic or compressible washers 22 and 23 interposed between the arched member 16 and the flange 11 so that by manipulating the screws 20 and 21 such washers may be compressed to adjust the arched member 16 and consequently the points 18 and 19 relative to the flange 11. By compressing one of the washers 22 or 23 more than the other washer it is obvious that the corresponding point 18 or 19 will be depressed a greater distance below the line of the under side of the flange 11 than the other. By this arrangement the proper height of the horns of the raker 15 may be readily determined even when it is required that one of the points be higher than the other.

To employ the device as a jointer in the ordinary sense of the word a file 24 is placed upon the block 25 and a screw 26 passing through a lug 27 is employed to clamp the file in such position. Such lug 27 and the edge of the flange 11 opposite the plane of the ribs 12 and 13 are employed to properly position the saw relative to the file when it is employed for jointing purposes in the usual well-known manner.

The block 25 is connected with the frame in a manner similar to the attachment of the arched member 16, that is to say by the employment of screws 27 and 28 with elastic or compressible washers 29 interposed between the block and the frame. By adjusting the screws 27 and 28 the position of the block can, therefore, be changed. The exact position of the block is immaterial so far as its employment to retain the file is concerned as the plane of the file determines the line of extremities of the teeth of the saw. This block 25, however, has another utility in that it is provided with a mortise 30 through which the raker 15 will extend, as shown more particularly in Figs. 6 and 7. This block 25 is capable of being reversed relative to the frame and when used in the position shown in Fig. 6 relative to the raker the upper or plane side is used to guide a file to dress off the horns of the raker to the required height. By reversing the block to the position shown in Fig. 7 it forms a pattern for the file to follow in dressing the raker to the required height and shape.

The device comprises, therefore, not only the form or pattern to guide the file in properly dressing the raker tooth but the gage determines whether or not the raker tooth is of such height as to require dressing.

I claim:

1. In a device of the class described, a body, spaced devices located in a given plane and extending laterally from the body, a member spanning the space between said devices, spaced points carried by the member, and means for simultaneously adjusting said points relative to the spaced devices, the degree of movement of one point being greater than that of the other.

2. In a device of the class described, a body; a flange extending laterally from one side of the body and interrupted intermediate its ends; a member spanning the interval of the interruption; spaced gage points fixedly carried by the spanning member extending normally below the plane of the flange; and means permitting the adjustment of the points unequally relative to the plane of the flange.

3. In a device of the character described, a body, a flange extending from one side of the body and interrupted between its ends, an arc member spanning the interval, spaced gage points integral with the spanning member, and means for adjusting said spanning member to permit the unequal adjustment of said points relatively to the plane of the flange.

4. In a device of the character described, a body, a flange extending from one side of the body and interrupted between its ends, an arc member spanning said interval, an arm extending substantially from the center of said arc member and terminating with a crescent shaped gage pointer, said gage points being adapted to normally extend below the plane of said flange, and means rendering said arc member movable whereby the points of said gage may be unequally adjusted relative to the plane of the flange.

In testimony whereof I affix my signature in presence of two witnesses.

JOHN B. PERRY.

Witnesses:
G. WARD KEMP,
ED. M. BAYLISS.